(No Model.)
A. SCARLETT.
PROP FOR POLES OR SHAFTS.
No. 488,406. Patented Dec. 20, 1892.
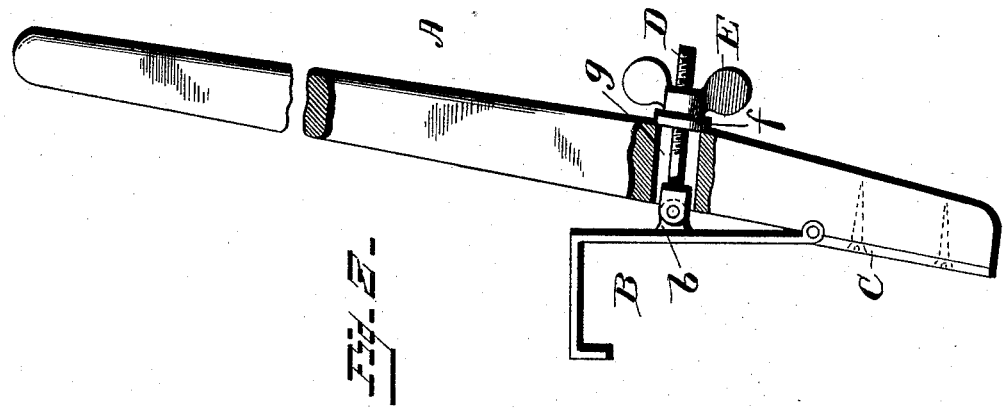
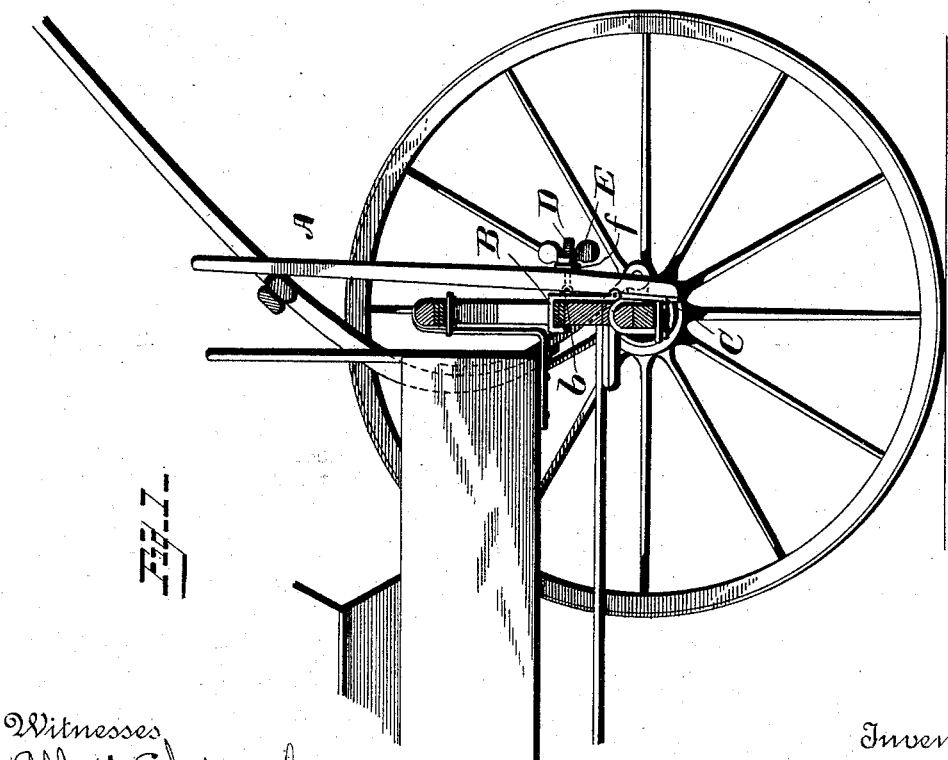
Witnesses
Albert Speidel
Lillie M. Hillyard
Inventor
Alfred Scarlett,
By his Attorneys
R.S. & A.P. Lacey

UNITED STATES PATENT OFFICE.

ALFRED SCARLETT, OF WEST SUPERIOR, WISCONSIN.

PROP FOR POLES OR SHAFTS.

SPECIFICATION forming part of Letters Patent No. 488,406, dated December 20, 1892.

Application filed June 4, 1892. Serial No. 435,523. (No model.)

*To all whom it may concern:*

Be it known that I, ALFRED SCARLETT, a citizen of the United States, residing at West Superior, in the county of Douglas, State of Wisconsin, have invented certain new and useful Improvements in Props for Poles and Shafts; and I do hereby declare the following to be a full, clear, and exact description of the invention, such as will enable others skilled in the art to which it appertains to make and use the same.

My invention relates to props for vehicle shafts and poles.

The purpose of the invention is to provide a prop which in its application will obtain a positive engagement with the axle, or spring thereby preventing its accidental slipping should the shaft or pole be accidentally disturbed.

A further purpose of the invention is to provide a prop which can be readily adjusted to hold the shaft or pole at any desired angle. to suit the nature of the vehicle or the place where the vehicle is kept.

The improvement consists of the novel features and the peculiar construction and combination of the parts which will be hereinafter more fully described and claimed and which are shown in the annexed drawings, in which;

Figure 1 is a detail view showing the application of the invention. Fig. 2 is a side elevation of the prop.

The prop is composed, essentially, of two parts the lever A and the grab hook B. The latter is secured near one end of the lever A and is designed in practice to fit over and rest upon the top side of the axle or spring and support the prop in the desired position. In order that the prop may be adjustable to support the shafts or poles at the required elevation, the grab hook B is pivotally connected with the said lever and adapted to be adjusted at its free end to and from the said lever. For convenience the grab hook B is hinged to a plate C which latter is secured to the lever A in any convenient manner. Suitable means are provided to positively adjust the grab hook B to and from the lever A. As shown, these means consists of a rod D which is pivotally connected at its inner end to the grab hook and which passes through the transverse opening in the lever A and is threaded for a short distance from its outer end. The thumb nut E mounted on the threaded portion of the rod D is provided to be operated by the hand so as to properly adjust the grab hook B. A washer $f$ is interposed between the lever A and the thumb nut E to prevent wear on the said lever. The rear face of the grab hook B is provided with a lug $b$ to which the rod D is pivotally connected, the inner end of said rod being constructed to embrace the sides of the said lug and being connected therewith by a rivet in the ordinary manner.

In the application of the invention the lower end of the prop is thrusted between the fifth wheel and the axle or spring and the grab hook B engages with the axle or spring and supports the prop in the desired position. The cross bar of the shafts or the pole will engage with the upper portion of the prop in the ordinary manner and serve to support the said shaft or pole at the required elevation. By adjusting the thumb nut E the grab hook B will be moved to or from the lever A so as to support the shafts or poles at the proper angle.

Having thus described my invention, what I claim, and desire to secure by Letters Patent is;

1. A prop for vehicle shafts and poles consisting of the lever, a grab hook having pivotal connection with said lever, and means for adjusting the said grab hook to and from the lever, substantially as and for the purpose set forth.

2. A prop for vehicle shafts and poles consisting of a lever, a plate secured to said lever, a grab hook having pivotal connection with said plate, and means for adjusting the said grab hook to and from the lever, substantially as and for the purpose set forth.

3. A prop for vehicle shafts and poles consisting of a lever, plate C attached to said lever, grab hook B pivotally connected with plate C and having lug $b$ on its rear face, rod D extending through a transverse opening in the lever A and pivotally connected with the lug $b$ and threaded at its outer end, and a thumb nut mounted on the threaded portion of said rod D, substantially as set forth.

In testimony whereof I affix my signature in presence of two witnesses.

ALFRED SCARLETT.

Witnesses:
W. M. GRAHAM,
JAMES LOGIE.